(12) United States Patent
Lah

(10) Patent No.: US 7,530,574 B2
(45) Date of Patent: May 12, 2009

(54) DYNAMIC FLANGE SEAL AND SEALING SYSTEM

(75) Inventor: Ruben F. Lah, West Jordan, UT (US)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 0 days.

(21) Appl. No.: 11/870,337

(22) Filed: Oct. 10, 2007

(65) Prior Publication Data
US 2008/0143059 A1    Jun. 19, 2008

Related U.S. Application Data

(62) Division of application No. 10/412,628, filed on Apr. 11, 2003, now Pat. No. 7,316,762.

(51) Int. Cl.
F16L 17/00 (2006.01)
F16L 21/05 (2006.01)
F16L 17/06 (2006.01)
F16J 15/02 (2006.01)

(52) U.S. Cl. .......................... 277/314; 277/603; 277/608; 277/609; 277/647

(58) Field of Classification Search ................. 277/314, 277/603, 608–609, 616, 647, 643; 202/217, 202/221, 222, 239, 270, 242, 244, 245, 246, 202/247, 248, 251, 252, 253; 49/453; 137/15.23, 137/315.12
See application file for complete search history.

(56) References Cited

U.S. PATENT DOCUMENTS

| | | | |
|---|---|---|---|
| 176,321 | A | 4/1876 | Kromer |
| 1,656,355 | A | 1/1928 | Huffmann |
| 1,991,621 | A | 2/1935 | Noll |
| 2,064,567 | A | 12/1936 | Riley |
| 2,245,554 | A | 6/1941 | Court |
| 2,317,566 | A | 4/1943 | Utterback |

(Continued)

FOREIGN PATENT DOCUMENTS

JP     2000145989     5/2000

(Continued)

OTHER PUBLICATIONS

U.S. Appl. No. 10/731,874, Non-Final Rejection issued Feb. 23, 2005 by the United States Patent and Trademark Office. pp. 1-10.

(Continued)

*Primary Examiner*—Vishal Patel
(74) *Attorney, Agent, or Firm*—Kirton & McConkie; Michael F. Krieger

(57) ABSTRACT

The present invention features a flange to flange dynamic seal and sealing system, particularly suited for use within high temperature, high pressure environments, such as a delayed coking process. The dynamic flange seal and sealing system comprises two primary elements or seals, each of which are capable of independently forming a flange seal between two flanged components or combining to create a flange seal. The flange seal created by the dynamic flange seal and sealing system is capable of being maintained in light of, or rather the sealing system adapts to, any structural or environmental changes within the connected flanges. As such, the flange seal may be a dynamic flange seal or a static flange seal or both.

4 Claims, 6 Drawing Sheets

U.S. PATENT DOCUMENTS

| | | | |
|---|---|---|---|
| 2,403,608 A | 7/1946 | Payne et al. | |
| 2,562,285 A | 7/1951 | Timmer | |
| 2,717,865 A | 9/1955 | Kimberlin, Jr. et al. | |
| 2,734,715 A | 5/1956 | Knox | |
| 2,761,160 A | 9/1956 | Manning | |
| 3,083,023 A * | 3/1963 | Creavey | 277/647 |
| 3,215,399 A | 11/1965 | McInerney et al. | |
| 3,379,623 A | 4/1968 | Forsyth | |
| 3,617,480 A | 11/1971 | Keel | |
| 3,646,947 A | 3/1972 | Rochelle et al. | |
| 3,716,310 A | 2/1973 | Guenther | |
| 3,837,356 A | 9/1974 | Selep et al. | |
| 3,852,047 A | 12/1974 | Schlinger et al. | |
| 4,125,438 A | 11/1978 | Kelly et al. | |
| 4,174,728 A | 11/1979 | Usnick et al. | |
| 4,253,487 A | 3/1981 | Worley et al. | |
| 4,275,842 A | 6/1981 | Purton et al. | |
| 4,410,398 A | 10/1983 | Chipman et al. | |
| 4,492,103 A | 1/1985 | Naumann | |
| 4,494,762 A * | 1/1985 | Geipel | 277/614 |
| 4,531,539 A | 7/1985 | Jandrasi | |
| 4,611,613 A | 9/1986 | Kaplan | |
| 4,626,320 A | 12/1986 | Alworth et al. | |
| 4,666,585 A | 5/1987 | Figgins et al. | |
| 4,726,109 A | 2/1988 | Malsbury et al. | |
| 4,738,399 A | 4/1988 | Adams | |
| 4,771,805 A | 9/1988 | Maa | |
| 4,797,197 A | 1/1989 | Mallari | |
| 4,824,016 A | 4/1989 | Cody et al. | |
| 4,877,488 A | 10/1989 | Cody et al. | |
| 4,923,021 A | 5/1990 | Courmier et al. | |
| 4,929,339 A | 5/1990 | Elliot, Jr. et al. | |
| 4,960,358 A | 10/1990 | DiGiacomo et al. | |
| 4,973,386 A | 11/1990 | Callegari et al. | |
| 4,993,264 A | 2/1991 | Cody et al. | |
| 5,004,152 A | 4/1991 | Baker et al. | |
| 5,022,266 A | 6/1991 | Cody et al. | |
| 5,022,268 A | 6/1991 | Wolf et al. | |
| 5,024,730 A | 6/1991 | Colvert | |
| 5,035,221 A | 7/1991 | Martin | |
| 5,041,207 A | 8/1991 | Harrington et al. | |
| 5,048,876 A | 9/1991 | Wallskog | |
| 5,107,873 A | 4/1992 | Clinger | |
| 5,116,022 A | 5/1992 | Genreith et al. | |
| 5,188,506 A * | 2/1993 | Creevy et al. | 415/115 |
| 5,221,019 A | 6/1993 | Pechacek et al. | |
| 5,228,525 A | 7/1993 | Denney et al. | |
| 5,228,825 A | 7/1993 | Fruchtbaum et al. | |
| 5,299,841 A | 4/1994 | Schaefer | |
| 5,417,811 A | 5/1995 | Malsbury | |
| H1442 H | 6/1995 | Edgerton et al. | |
| 5,464,035 A | 11/1995 | Heinecke | |
| 5,581,864 A | 12/1996 | Rabet | |
| 5,633,462 A | 5/1997 | Heaslip et al. | |
| 5,652,145 A | 7/1997 | Cody et al. | |
| 5,785,843 A | 7/1998 | Antalffy et al. | |
| 5,800,680 A | 9/1998 | Guerra | |
| 5,816,505 A | 10/1998 | Tran et al. | |
| 5,816,787 A | 10/1998 | Brinkerhoff | |
| 5,876,568 A | 3/1999 | Kindersley | |
| 5,927,684 A | 7/1999 | Marx et al. | |
| 5,947,674 A | 9/1999 | Malsbury et al. | |
| 5,974,887 A | 11/1999 | Cody et al. | |
| 6,007,068 A | 12/1999 | Dellacorte | |
| 6,039,844 A | 3/2000 | Malik | |
| 6,066,237 A | 5/2000 | Kindersley | |
| 6,076,835 A * | 6/2000 | Ress et al. | 277/637 |
| 6,113,745 A | 9/2000 | Maitland et al. | |
| 6,117,308 A | 9/2000 | Ganji | |
| 6,223,925 B1 | 5/2001 | Malsbury et al. | |
| 6,228,225 B1 | 5/2001 | Meher-Homji | |
| 6,254,733 B1 | 7/2001 | Lu et al. | |
| 6,264,797 B1 | 7/2001 | Schroeder et al. | |
| 6,264,829 B1 | 7/2001 | Antalffy et al. | |
| 6,352,267 B1 * | 3/2002 | Rode | 277/631 |
| 6,367,843 B1 | 4/2002 | Fetzer | |
| 6,539,805 B2 | 4/2003 | Heaslip et al. | |
| 6,547,250 B1 | 4/2003 | Noble et al. | |
| 6,565,714 B2 | 5/2003 | Lah | |
| 6,644,436 B2 | 11/2003 | Hofmann et al. | |
| 6,644,567 B1 | 11/2003 | Adams et al. | |
| 6,660,131 B2 | 12/2003 | Lah | |
| 6,738,697 B2 | 5/2004 | Breed | |
| 6,751,852 B2 | 6/2004 | Malsbury et al. | |
| 6,843,889 B2 | 1/2005 | Lah | |
| 6,926,807 B2 | 8/2005 | Bosi et al. | |
| 6,964,727 B2 | 11/2005 | Lah | |
| 6,989,081 B2 | 1/2006 | Lah | |
| 7,033,460 B2 | 4/2006 | Lah | |
| 7,037,408 B2 | 5/2006 | Wilborn et al. | |
| 7,115,190 B2 | 10/2006 | Lah | |
| 7,117,959 B2 | 10/2006 | Lah | |
| 7,316,762 B2 | 1/2008 | Lah | |
| 2002/0134658 A1 | 9/2002 | Lah | |
| 2002/0157897 A1 | 10/2002 | Hofmann et al. | |
| 2002/0166862 A1 | 11/2002 | Malsbury et al. | |
| 2002/0170814 A1 | 11/2002 | Lah | |
| 2003/0047153 A1 | 3/2003 | Kubel et al. | |
| 2003/0089589 A1 | 5/2003 | Malsbury | |
| 2003/0127314 A1 | 7/2003 | Bell et al. | |
| 2003/0159737 A1 | 8/2003 | Stares | |
| 2003/0185718 A1 | 10/2003 | Sellakumar | |
| 2004/0118746 A1 | 6/2004 | Wilborn et al. | |
| 2004/0154913 A1 | 8/2004 | Lah | |

FOREIGN PATENT DOCUMENTS

| | | |
|---|---|---|
| SU | 558524 | 3/1984 |
| SU | 959413 | 3/1984 |
| WO | 0015985 | 3/2000 |

OTHER PUBLICATIONS

U.S. Appl. No. 10/731,874, Final Rejection issued Jun. 28, 2005 by the United States Patent and Trademark Office. pp. 1-7.

U.S. Appl. No. 10/731,874, Examiner's search and strategy results issued Sep. 26, 2005. 1 page.

U.S. Appl. No. 10/731,874, Notice of Allowance of Fees Due, Issue Information, Index of Claims and Search information issued Sep. 29, 2005 by the United States Patent and Trademark Office; 7 pages.

U.S. Appl. No. 10/731,974, Notice of Allowance of Fees Dues, List of References, Issue Information, Search information and index of claims issued Jan. 18, 2006 by the United States Patent and Trademark Office; 10 pages.

U.S. Appl. No. 10/731,874, Non-Final Rejection issued Oct. 13, 2006 by the United States Patent and Trademark Office; 22 pages.

U.S. Appl. No. 10/731,874, Non-Final Rejection issued Apr. 6, 2007 by the United States Patent and Trademark Office; 14 pages.

U.S. Appl. No. 10/731,874, Requirement for Restriction/Election, List of References and index of claims issued Sep. 6, 2007 by the United States Patent and Trademark Office; 20 pages.

U.S. Appl. No. 10/731,874, Examiner's search strategy and results issued Dec. 5, 2007, 1 page.

U.S. Appl. No. 10/731,874, Non-Final Rejection issued Dec. 11, 2007 by the United States Patent and Trademark Office; 22 pages.

U.S. Appl. No. 10/997,834, Examiner's search strategy and results issued Jun. 22, 2005; 5 pages.

U.S. Appl. No. 10/997,834, Non-Final Rejection issued Jul. 6, 2005 by the United States Patent and Trademark Office; 44 pages.

U.S. Appl. No. 10/997,834, Examiner's search strategy and results issued Sep. 26, 2005; 1 page.

U.S. Appl. No. 10/997,834, Notice of Allowance and Fees, Issue Information, Index of Claims and search information issued Sep. 29, 2005 by the United States Patent and Trademark Office; 8 pages.

U.S. Appl. No. 10/411,849, Examiner's search strategy and results issued Aug. 4, 2005; 5 pages.

U.S. Appl. No. 10/411,849, Non-Final Rejection issued Aug. 9, 2005 by the United States Patent and Trademark Office; 8 pages.

U.S. Appl. No. 10/411,849, Non-Final Rejection issued Feb. 8, 2006 by the United States Patent and Trademark Office; 7 pages.

U.S. Appl. No. 10/411,849, Examiner's search strategy and results issued Jul. 18, 2006; 1 page.

U.S. Appl. No. 10/411,849, Notice of Allowance and Fees Due, Examiner Interview Summary Record, Issue Information, Index of Claims, Search Information and Bibliographic Data Sheet issued Jul. 24, 2006 by the United States Patent and Trademark Office; 14 pages.

U.S. Appl. No. 10/997,234, Examiner's search strategy and results issued Mar. 14, 2006; 3 pages.

U.S. Appl. No. 10/997,234, Non-Final Rejection issued Mar. 20, 2006 by the United States Patent and Trademark Office, 13 pages.

U.S. Appl. No. 10/997,234, Examiner's search strategy and results issued Aug. 4, 2006; 1 page.

U.S. Appl. No. 10/997,234, Notice of Allowance and Fees Due, Issue Information, Bibliographic Data Sheet, Index of Claims and Search Information issued Aug. 10, 2006 by the United States Patent and Trademark Office, 8 pages.

U.S. Appl. No. 10/412,628, Non-Final Rejection issued Feb. 16, 2007 by the United States Patent and Trademark Office; 17 pages.

U.S. Appl. No. 10/412,628, Notice of Allowance and Fees Due, Bibliographic Data Sheet, Index of Claims, Search Information and Issue Information issued Aug. 24, 2007 by the United States Patent and Trademark Office; 11 pages.

U.S. Appl. No. 10/873,022, Non-Final Rejection issued Jul. 7, 2005 by the United States Patent and Trademark Office; 12 pages.

U.S. Appl. No. 10/873,022, Notice of Allowance and Fees Due, Specification and Issue Information issued Jan. 4, 2006 by the United States Patent and Trademark Office, 9 pages.

U.S. Appl. No. 10/274,280, Examiner's search strategy and results issued Mar. 14, 2004; 2 pages.

U.S. Appl. No. 10/274,280, Non-Final Rejection issued Mar. 25, 2004 by the United States Patent and Trademark Office; 10 pages.

U.S. Appl. No. 10/274,280, Notice of Allowance and Fees Due, Issue Information and Bibliographic Data Sheet issued Oct. 5, 2004 by the United States Patent and Trademark Office; 8 pages.

U.S. Appl. No. 10/442,673, Examiner's search strategy and results issued Aug. 26, 2004, 2 pages.

U.S. Appl. No. 10/442,673, Non-Final Rejection issued Sep. 1, 2004 by the United States Patent and Trademark Office; 10 pages.

U.S. Appl. No. 10/442,673, Final Rejection issued Feb. 23, 2005 by the United States Patent and Trademark Office; 6 pages.

U.S. Appl. No. 10/442,673, Notice of Allowance and Fees Due, Amendment After Final, Issue Information, Index of Claims and Search Information issued Apr. 20, 2005 by the United States Patent and Trademark Office; 10 pages.

J. J. Kelley, "Applied Artificial Intelligence for Delayed Coking", Hydorcarbon Processing, Nov. 2000, 144-A-144-J, Gulf Publishing Company, USA.

Claudio Allevato & Richard S. Boswell, "Assessing the Structural Integrity and Remaining Life of Coke Drums with Acoustic Emission Testing, Stain Gaging, and Finite Element Analysis," ETCE 99—Symposium on Plant and Facilities Reliability and Mechanical Integrity, 1999 Engineering Source Technology Conference & Exhibition, Stress Engineering Services, Inc.

Norm Lieberman, "Coke Drum Foam-Overs Causes & Cures," http://www.coking.com/Foamover.htm.

Paul J. Ellis & Christopher A. Paul, "Tutorial: Delayed Coking Fundamentals," AIChE 1998 Spring National Meeting's International Conference on Refinery Processes Topical Conference Preprints 1998, 1998, Great Lakes Carbon Corporation.

* cited by examiner

DYNAMIC FLANGE SEAL AND SEALING SYSTEM

RELATED APPLICATIONS

This application is a divisional of U.S. patent application Ser. No. 10/412,628, entitled DYNAMIC FLANGE SEAL AND SEALING SYSTEM, filed Apr. 11, 2003 now U.S. Pat. No. 7,316,762, and claims priority to U.S. patent application. Ser. No. 09/946,917, entitled COKE DRUM BOTTOM DE-HEADING SYSTEM, filed Sep. 5, 2001.

BACKGROUND

1. Field of the Invention

The present invention relates to seals and dynamic sealing systems for sealing one or more connected flanges together, or generally a dynamic flange seal and sealing system for flanged components. The present invention more particularly relates to a dynamic flange seal and sealing system capable of forming a dynamic flange seal capable of adjusting with various structural or environmental changes in order to maintain the integrity of the seal existing between two or more connected flanges.

2. Background of the Invention and Related Art

In virtually every conduit or pipe installation where moderate to high pressures and temperatures exist, a problem is encountered when it comes to flange design and usage. Most problems either reside in the actual connection itself, the means used to connect the flanges together, or the seal existing and desired there between. There are presently many flanged components or structures on the market which are attached to other components, pipes, conduits, or the like. The relative size and complexity of these flanges varies with the size of the needed components.

In many high pressure, high temperature systems, seals are used to maintain the pressure in the system. Almost all prior art seals use a gasket between the coupled flanged components. Most of these seals use the force required to secure the flanged components together to also create the seal. This requires many connections to apply enough force over a wide area to eliminate gaps in the seal.

Many gaskets used to provide a seal between connected flanged components are made of an elastic material like rubber, since elastic gaskets can be reused. However, elastic materials, while useful in many settings, are not suited for high pressure, high temperature environments for obvious reasons. Indeed, elastic gaskets typically are utilized only in settings where the temperature is kept below 250 degrees F. In addition, elastic gaskets tend to wear out relatively quickly, especially when subject to extreme conditions. Any degradation of the seal existing between connected flanged components usually means that the system will experience leaks and other failures. For these reasons, elastic gaskets are less than desirable for use in many settings.

Several other settings call for less-elastic, metallic gaskets, since they have many advantages over their elastic counterparts. Metallic gaskets can be used in many extreme environments where higher temperatures and pressures exist. However, because metallic gaskets are less elastic, they cannot generally be reused. Moreover, metallic gaskets are subject to leaks caused by various stresses (and stress relief) and creep.

A few special seals are designed to prevent leaks due to creep and repeated stress. For instance, a Batzer flange, commonly known in the prior art, provides sufficient elastic deflection and seal force to maintain a seal when creep and relief stresses are present. Batzer flanges have a slightly conical flange. The slight deflection in the flange making the conical shape provides the elastic deflection. However, a problem with the Batzer seal is that as the size of the seal increases the flange size must also increase. As such, large seals require abnormally and oftentimes prohibitively large flanges. Also the seal is typically positioned along an edge, which makes the seal more vulnerable to corrosion or damage.

SUMMARY AND OBJECTS OF THE INVENTION

In light of the deficiencies in the prior art, the present invention seeks to improve flange to flange connections by providing a seal that accounts for cyclical variations of temperature and pressure between flanged components.

Therefore, it is an object of some embodiments of the present invention to provide a flexible or dynamic flange seal and sealing system that provides an improved seal between flanged components.

It is another object of some embodiments of the present invention to provide a dynamic flange seal and sealing system that can withstand high temperature, high pressure environments by adjusting to structural and/or environmental changes often experienced in an extreme environment.

It is still another object of some embodiments of the present invention to provide a dynamic flange seal and sealing system that may be used within new components, but that is also capable of being retro-fit into existing components, such as on-site modifying of flanged components to support the dynamic flange seal and sealing system as taught herein.

Other objects not specifically recited herein will be apparent to one of ordinary skill in the art. As such, these are not meant to be limiting in any way.

In accordance with the invention as embodied and broadly described herein, the present invention features a flange to flange dynamic seal and sealing system. There are two primary elements or seals featured in this system, or rather, the system comprises two primary seals, each of which are capable of independently forming a flange seal between two flanged components. Specifically, these primary seals are an iconel bellows seal and a bi-material seal, each of which surround a flange opening along a sealing surface either in whole or in segments. As stated, each of these elements are independent of one another and form independent seals. However, these elements may also be combined, or used in conjunction with one another, to create a redundant flange seal. In addition, the flange seal created by the dynamic flange seal and sealing system is capable of being maintained in light of, or rather the dynamic sealing system adapts to, any structural or environmental changes between the connected flanges.

In one exemplary embodiment of the seal system, two iconel bellow seals are contained and supported within a recess formed in a first flange of a first component or member, wherein the iconel bellows seals are separated by a seal stainless steel annular spacer. The iconel bellows seal functions to provide a biased, dynamic seal by allowing for and providing adjustments within the seal as dictated by the existing conditions experienced between the flanges. Stated another way, the iconel bellows seal is capable of expanding to maintain a seal even when the flanged components separate slightly from each other, to maintain the integrity of the seal.

The iconel bellows seal comprises a corrugated stainless steel ribbon which is compressed between two flanged elements, and is seated in a recess between the flanges.

Preferably, the iconel bellows seal provides even further sealing by applying a silver seal to the milled recess in the flanges before and after inserting the bellows seals and spacers. The silver seal or other sealant may be omitted at the location where the inner bellows seal contacts the flange joint near the interior of the drum. This allows a small amount of steam to flow under pressure behind the blows seal and to the drum to pressurize the passage to contamination from coke from the contacting the down seal and to assist in monitoring the states of the seal. Of course, if necessary or desired, the iconel bellows seal could be sealed entirely so as to allow no fluid transfer therethrough. Likewise, the iconel bellows seal could be secured within the flange using no seals. In a semi-sealed configuration, the fluid flow is preferably specifically controlled using various means, such as via a steam inlet and purge system and associated control and monitoring module.

As stated, the dynamic flange seal and sealing system further features or comprises a seal in the form of a bi-material gasket. In one exemplary embodiment, the bi-material gasket is supported within a first flange and is preferably positioned adjacent an iconel bellows seal. The bi-material may also be a stand alone seal. The bi-material gasket preferably comprises a flexor and a flexible sealant adjacent to the flexor that displaces in response to any flexing or contracting of the flexor. The flexor is caused to contract as the first flange and a second flange are coupled together, and as means for coupling and securing the two components together is actuated (e.g. bolts tightened, latches latched, etc.). The connection and subsequent securing of the two flanges together forces the flexor to contract. This contraction resultantly causes the flexible sealant attached thereto to displace and seal against the sealing surfaces of the two connected flanges. The greater the compression between the flanges, the more the flexible sealant is forced to displace and the tighter, more secure the seal between the flanges. This concept is referred to herein as the flex factor of the flexor and is relative to the amount of force exerted upon or applied to the flexor as a result of the pressure within or compression between the connected flanges. Together or separate, the iconel bellows seal and the bi-material gasket function to form a flange seal between the flanges of two or more connected components. In a preferred embodiment, the flexor is comprised of a corrugated metal c-ring supported within a recess in the sealing surface of a flange. The metal c-ring further comprises a surface to which the flexible sealant is juxtaposed and/or attached. The flexible sealant is preferably made of polycarbon graphite, but may comprise any material capable of displacing with the contraction of the flexor against the connected flanges to create a flange seal. In addition, other shapes and designs for the flexor are contemplated herein.

The present invention dynamic flange seal and sealing system is particularly suited for operation or use with a delayed coking process, and specifically between the various components present within a delayed coking system, such as a coke drum, a header, a de-header valve, a transition spool, an inlet feed, or a bonnet. Each of these component structures are coupled to one another, respectively, via their flanged segments and require a proper seal therebetween to function properly. Providing the flange connections within a delayed coking process with the present invention dynamic flange seal and sealing system provides many advantages, including, but not limited to, improving the integrity of the flange seals, the ability to account for structural and environmental changes without breaching the seals, and improving the overall efficiency of the coking process.

The present invention further features a method for sealing various flanged components within a high temperature, high pressure environment. This particular method comprises manufacturing flanges with the present invention dynamic flange seal and sealing system as described and taught herein.

The present invention still further features a method for sealing flanged components within a high temperature, high pressure environment. This particular method comprises retro-fitting or modifying existing flanged components, such as a coke drum, transitional spool, feed inlet, and/or de-header valve, with the present invention dynamic flange seal and sealing system as described and taught herein.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 6, is not intended to limit the scope of the invention, as claimed, but is merely representative of the presently preferred embodiments of the invention.

The presently preferred embodiments of the invention will be best understood by reference to the drawings wherein like parts are designated by like numerals throughout.

Figure 1:
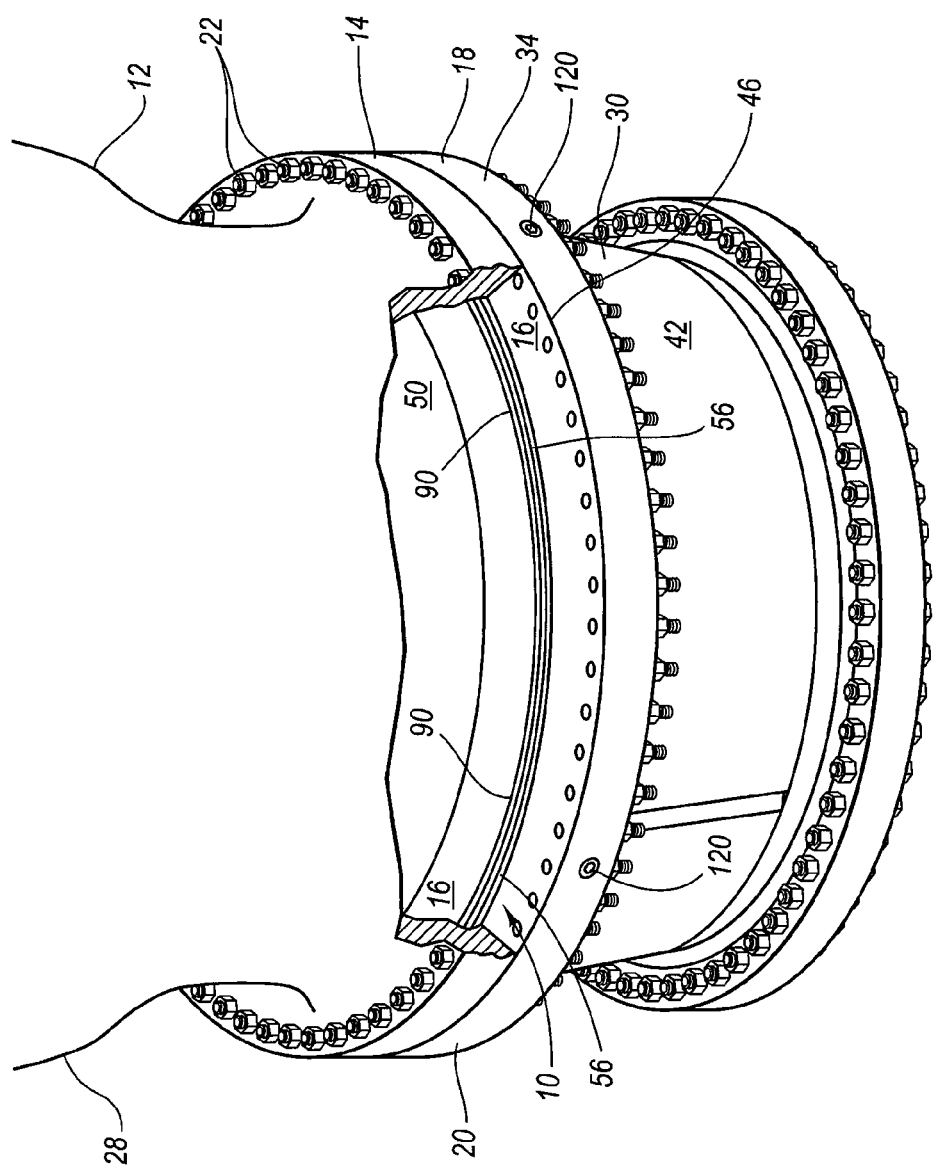
FIG. 1 illustrates a perspective view of a partial delayed coking system comprising a first flanged component, namely a coke drum, coupled to a second flanged component, namely a transitional spool, with a cutaway section showing the dynamic flange seal and sealing system as supported within or by the second flanged component, according to one exemplary embodiment of the present invention.

The present invention describes a method and system for providing a flange to flange seal using a dynamic flange seal and sealing system. With reference to FIG. 1, shown is a perspective view of one exemplary embodiment of a first flanged component 12 coupled to a second flanged component 20, with a cutaway section showing the dynamic flange seal and sealing system 10 as supported within or by second flanged component 20. Specifically, FIG. 1 illustrates a first component 12 having a flange 14 and a sealing surface 16 thereon. First component 12 is connected or coupled to second component 20 via their respective flanges using one of several means for connecting flanged components together. In one exemplary embodiment, means for connecting flanged components together comprises a bolt connection 22. Other means for connecting flanged components common in the art may be appropriate, each of which are contemplated herein. However, for the purposes of the present discussion, bolt connection 22 is the preferred means for connecting each of the flanged components discussed herein. Moreover, it should be noted that the detailed description set forth herein focuses on the connection and sealing of various flanged components. However, components not in possession of a flange may also comprise or be modified to comprise the present invention dynamic sealing system if appropriate. As such, the presence of a flange is not necessary for the present invention sealing system to function properly herein. To the contrary, any metal to metal, metal to plastic, plastic to plastic, etc. may be designed to utilize the present invention sealing system as taught and described herein. As such, the reference to connection of flanged components or a dynamic flanged seal and sealing system is for illustration purposes only and is merely an example of one exemplary, yet preferred, embodiment, and thus should not be considered limiting.

Second component 20 further comprises a flange or second flange 18, also comprising a sealing surface 24 (not shown) thereon, that is complimentary to and fits with flange 14 of first component 12 to form a connection of first and second components 12 and 20, respectively. As illustrated in FIG. 1, first component 12 comprises a coke drum 28 coupled to a transitional spool 30 via flanges 14 and 18, respectively, existing thereon. Coke drum 28 and transitional spool 30 are two components utilized in the high temperature, high pressure process or system known as delayed coking. Indeed, the design of the present invention dynamic flange seal and sealing system 10 lends itself particularly well to, or is particularly suited for, use within various high temperature, high pressure environments. In addition, the present invention dynamic flange seal and sealing system 10 may be utilized and implemented in the connections of other components, also possibly existing within various high pressure, high temperature environments. For example, in a delayed coking process or system, several components comprise flanges and are coupled together using their respective flanges. Some of the types of flanged components existing within a delayed coking system are a coke drum, a transitional spool, a header, a de-header valve, an inlet feed, and an upper and lower bonnet. Each of these components, or rather each connection between these components, may utilize or have implemented therein the present invention dynamic flange seal and sealing system 10 as taught and described herein. For example, transition spool 30 comprises an upper flange 34 and lower flange 38 supported by spool or sidewall 42. Transitional spool 30 may attach to coke drum 28 via its upper flange 34 as shown, as well as to a de-header valve (not shown) via its lower flange 38. Within each of these flanged connections of transitional spool 30, the present invention dynamic flange seal and sealing system 10 may be implemented and utilized to provide an improved and dynamic seal between each of these components, and particularly between the flanges of each of these components. Moreover, although not specifically discussed herein, dynamic flange seal and sealing system 10 may be utilized to seal components together in several different types of environments, other than a high pressure, high temperature environment.

As stated, and as can be seen in FIG. 1, first component 12 is coupled to second component 20 via their respective flanges 14 and 18. In addition, dynamic flange seal and sealing system 10 is supported entirely within sealing flange 14 and surface 16 of first component 12, wherein flange 18 of second component 20 is connected to flange 14 of first component 12, thus creating a flange seal and/or a dynamic flange seal between the two components. It should be noted herein that reference to a "first component" and a "second component" is purely relative and provided as simple reference points. Essentially, the flanges of two components are made to fit and connect to one another in a complimentary manner, with the flanges providing the means for securing two components together. As such, reference to a "first component" and a "second component" simply provides a way to distinguish between two flanged components that are being connected and secured together. Moreover, since the flanges of each respective component are complimentary to one another, the term "complimentary," or "complimentary flange," as discussed herein, is intended to mean or describe that particular flange that is being coupled to another flange, whether it be the flange of a first or second component. This definition is provided for convenience of the reader and to clarify the intended scope of the present invention, namely to not limit the reference to a "first component" and a "second component" in any way. For instance, if the dynamic seal and sealing system is supported within one flange, reference to the "complimentary flange" will mean that particular flange that is placed over the flange supporting or containing the system, whether it be associated with the first or second component. In reference to FIG. 1, first component 12 is identified as coke drum 28 and second component 20 is identified as transitional spool 30. However, in light of the present discussion, first component 12 may also refer to transitional spool 30 and second component 20 may refer to coke drum 28. In essence, reference to a first and second component, and any identification to or association with a particular item is merely for illustration and reference purposes only. Thus, if the flange of first component 12 is being discussed, the "complimentary flange" will refer to the flange of second component 20. Likewise, if the flange of second component 20 is being discussed, the "complimentary flange" will refer to the flange of first component 12.

FIG. 1 further illustrates, in its cut-away portion, dynamic flange seal and sealing system 10 as supported and contained within flange 18 (also identified as upper flange 34) of transitional spool 30. As is shown, dynamic flange seal and sealing system 10 comprises two seals, namely an iconel bellows seal 56 and a bi-material gasket 90 positioned within flange 18 and within sealing surface 16 between edge 46 and opening 50. In the exemplary embodiment shown in FIG. 1, bi-material gasket 90 is positioned inside iconel bellows seal 56 in an adjacent or juxtaposed manner. However, the positioning of each of iconel bellows seal 56 and bi-material gasket 90 with respect to each other and the supporting flange may comprise several arrangements. Indeed, since these seals function independently of the other, each may be positioned or arrayed anywhere along and around the sealing surface of the supporting flange in a circular manner.

As shown, each of iconel bellows seal 56 and bi-material gasket 90 extend or are arrayed around the entire rim portion of flange 18, and particularly sealing surface 16, in a circular manner. Moreover, each of iconel bellows seal 56 and bi-material gasket 90 may be comprised of single, unitary structures, or they may be segmented to comprise a plurality of similar pieces that fit together around flange 18. If segmented, each could comprise varying pieces to accommodate varying needs of a particular environment. For instance, if a heavier, more robust seal is needed in a particular quadrant and not others, providing a more robust segment of seal in this quadrant, yet that would still function with the other segments, would be possible. Various means for connecting these segments together are contemplated, and are those commonly known in the art.

Although FIG. 1 illustrates dynamic flange seal and sealing system 10 comprising both iconel bellows seal 56 and bi-material gasket 90, each of these two components are independent of one another in both function and form, and can each be used to create an independent flange seal between first and second components 12 and 20. However, in the exemplary, yet preferred embodiment shown in FIG. 1, dynamic flange seal and sealing system 10 comprises at least one iconel bellows seal 56 and at least one bi-material gasket 90. Of course, a plurality of each or either is contemplated herein, depending upon the needs and requirements of the particular flange connection being sealed.

FIG. 1 also illustrates steam purge inlet 120 as part of a steam purge and pressure control system. Steam purge inlet 120 comprises an opening in fluid connection with dynamic flange seal and sealing system 10, and particularly with each of iconel bellows seal 56 and bi-material gasket 90. Steam purge inlet 120 is simply a duct for fluid flow, wherein the pressure and flow of fluid within the system can be monitored, controlled, and regulated. Steam purge inlet 120 is preferably linked to an onsite monitoring and control system that allows operators to monitor the pressure within the flange connection and the sealing system due to the flow of fluid through the coupled components, as well any leaks in the flange connection and flange seal(s), and to control the flow of fluid within the sealing system. This concept is discussed in greater detail below.

Figure 2:
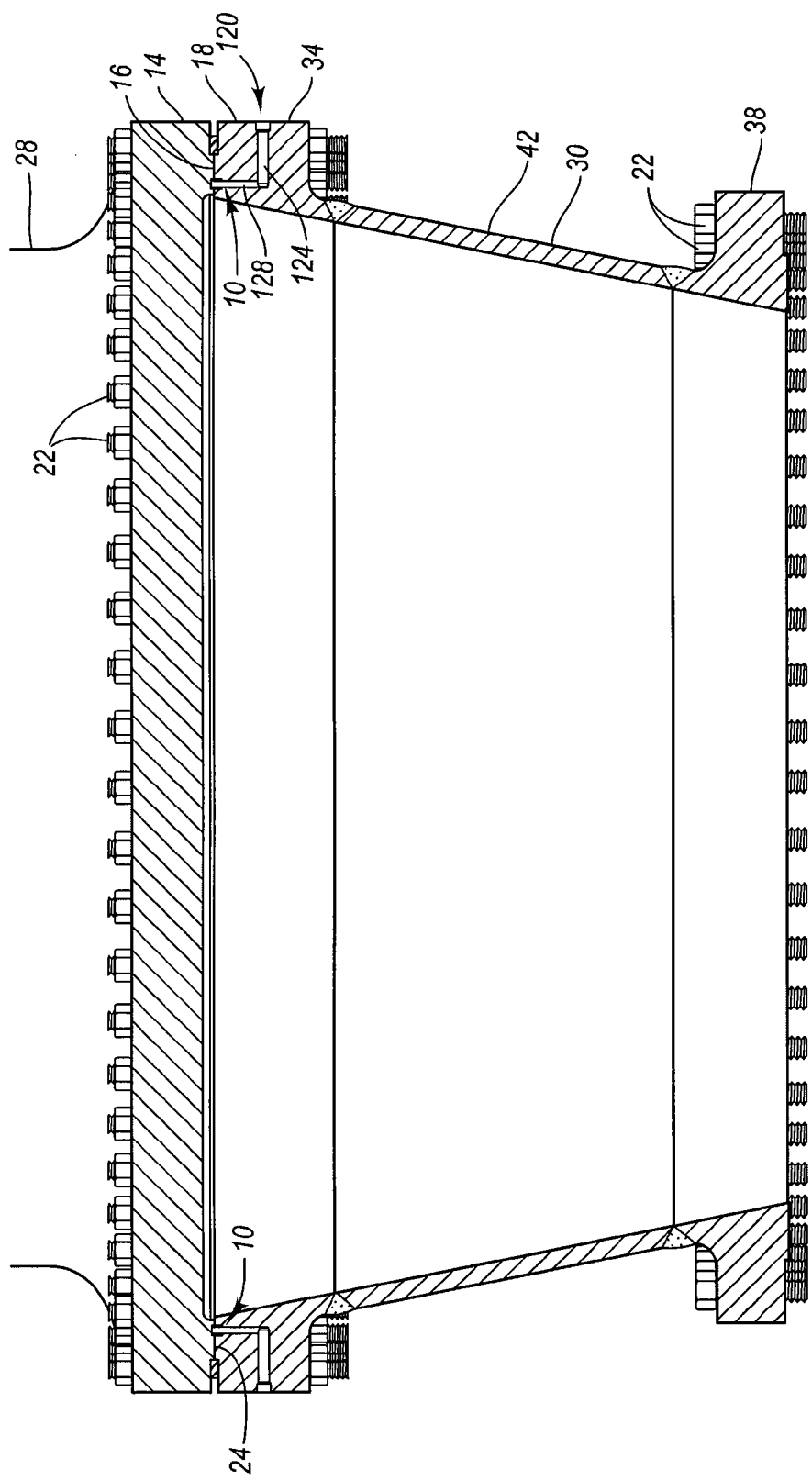
FIG. 2 illustrates a cross-sectional side view of the first and second flanged components illustrated in FIG. 1 as coupled and secured together, such that the dynamic flange seal and sealing system forms a flange seal between the two, according to one exemplary embodiment of the present invention.
Figure 3:
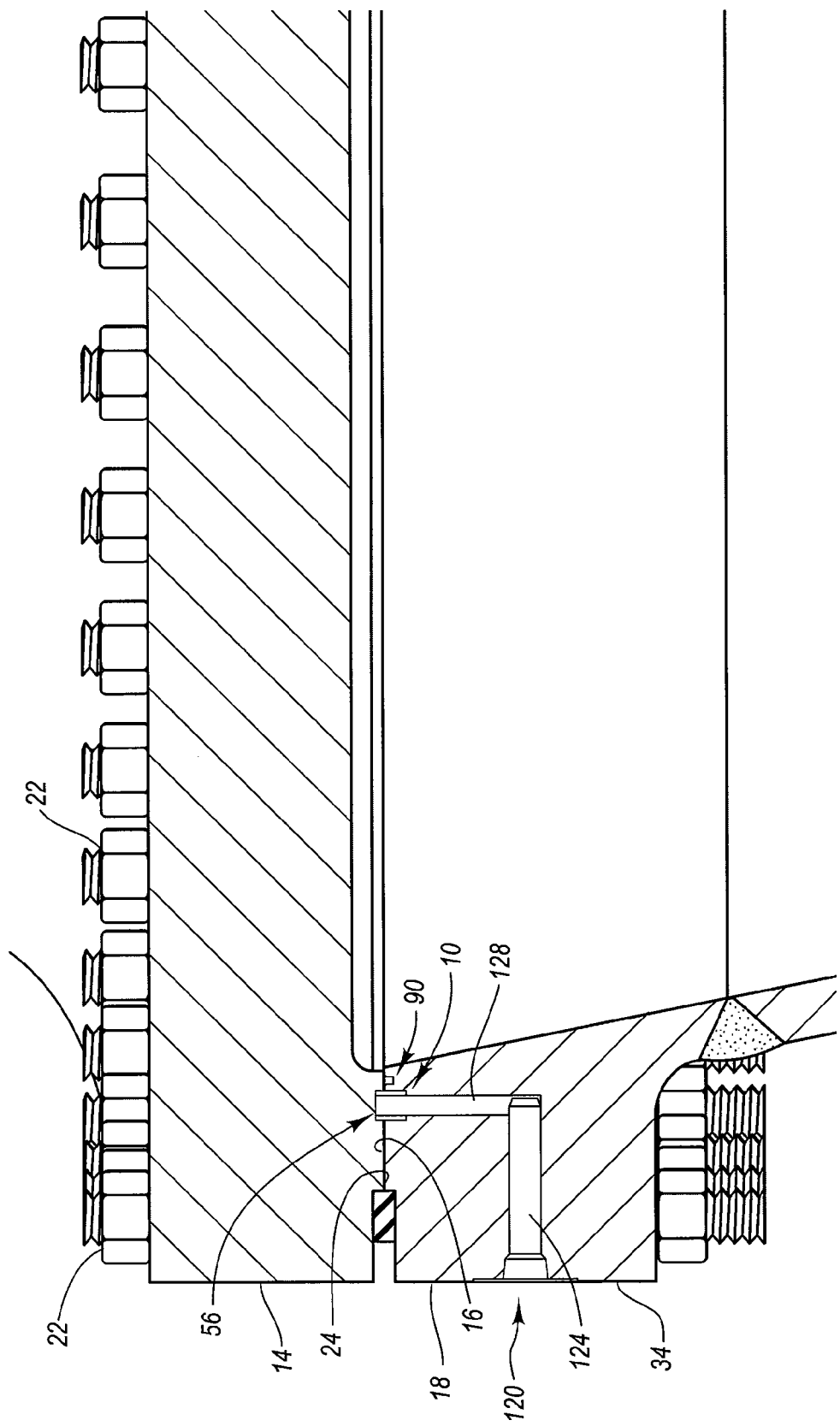
FIG. 3 illustrates a semi-detailed cross-sectional view of one segment or side of the first and second flanged components of FIG. 1 as comprising the dynamic flange seal and sealing system, according to one exemplary embodiment of the present invention.

FIGS. 2 and 3 illustrate cross-sectional side views of first and second flanged components 12 and 20, respectively, (shown as coke drum 28 and transitional spool 30) as coupled and secured together, such that dynamic flange seal and sealing system 10 forms a flange seal between first and second flanged components 12 and 20. Specifically, FIGS. 2 and 3 illustrate how sealing surface 16 of flange 14 and first component 12 fits and connects with complimentary sealing surface 24 of flange 18 and second component 20. For example, in a high pressure, high temperature environment, sealing surfaces 16 and 24 are machined to provide a fit or connection having tight or close tolerances. In addition, FIGS. 2 and 3 illustrate the relationship of iconel bellows seal 56 and bi-material gasket 90 with their respective supporting and securing flange (in this case flange 18), as well as with the complimentary flange (in this case flange 14). As can be seen from the Figures, iconel bellows seal is contained or supported and secured within a recess in flange 18 and extends from this recess into a similar recess existing within sealing surface 24 and flange 14. In addition, bi-material gasket is supported and secured within its own respective recess within flange 18, but only extends from this recess up to sealing surface 16 of flange 14. These recesses and the securing of iconel bellows seal 56 and bi-material gasket within their respective recesses is discussed in greater detail below with respect to FIGS. 4 and 5.

FIGS. 2 and 3 also illustrate, generally, the positioning and relationship of steam purge inlet 120 within flange 18 and with respect to dynamic flange seal and sealing system 10, and particularly iconel bellows seal 56. As can be seen, steam purge inlet is part of a steam purge and pressure/fluid control system having one or more passageways therein that allow controlled fluid to pass. In the embodiment shown, steam purge system comprises a horizontal passageway 124 in fluid connection with a vertical passageway 128 that is directly adjacent and in fluid connection with iconel bellows seal 56. The steam purge and fluid/pressure control system is linked to a control module that allows operators to monitor the pressure within the entire component system, and particularly between the flange connections and the flange seal(s). The steam purge and fluid/pressure control system also allows operators to control the pressure and fluid flow within the same to preserve the integrity of the created flange seal. For instance, fluid flow between the flange connections and within the flange seal indicates or signals to operators that there is a leak somewhere in the system. Using the steam purge system, operators are able to counteract or offset any leaks by controlling the pressure and steam purge within the system, thus controlling the flow of fluid in order to counter the leak and maintain the integrity of the flange seal. Steam purge system also functions to keep the flanges and the flange connection clean and free from any material or debris. The concept of the steam purge line and system is discussed further in relation to FIG. 5.

FIGS. 2-5 further illustrate the beveled portions of flange 14 and flange 18. Flanges 14 and 18 comprise beveled segments to assist in the orientation of flange 14 and flange 18 as they are being connected together. Moreover, iconel bellows seal 56 and bi-material gasket 90 are protected from damage from the flanges as they are being coupled or connected together because the flanges are assisted into place due to the existence of the beveled portions machined therein.

Figure 4:
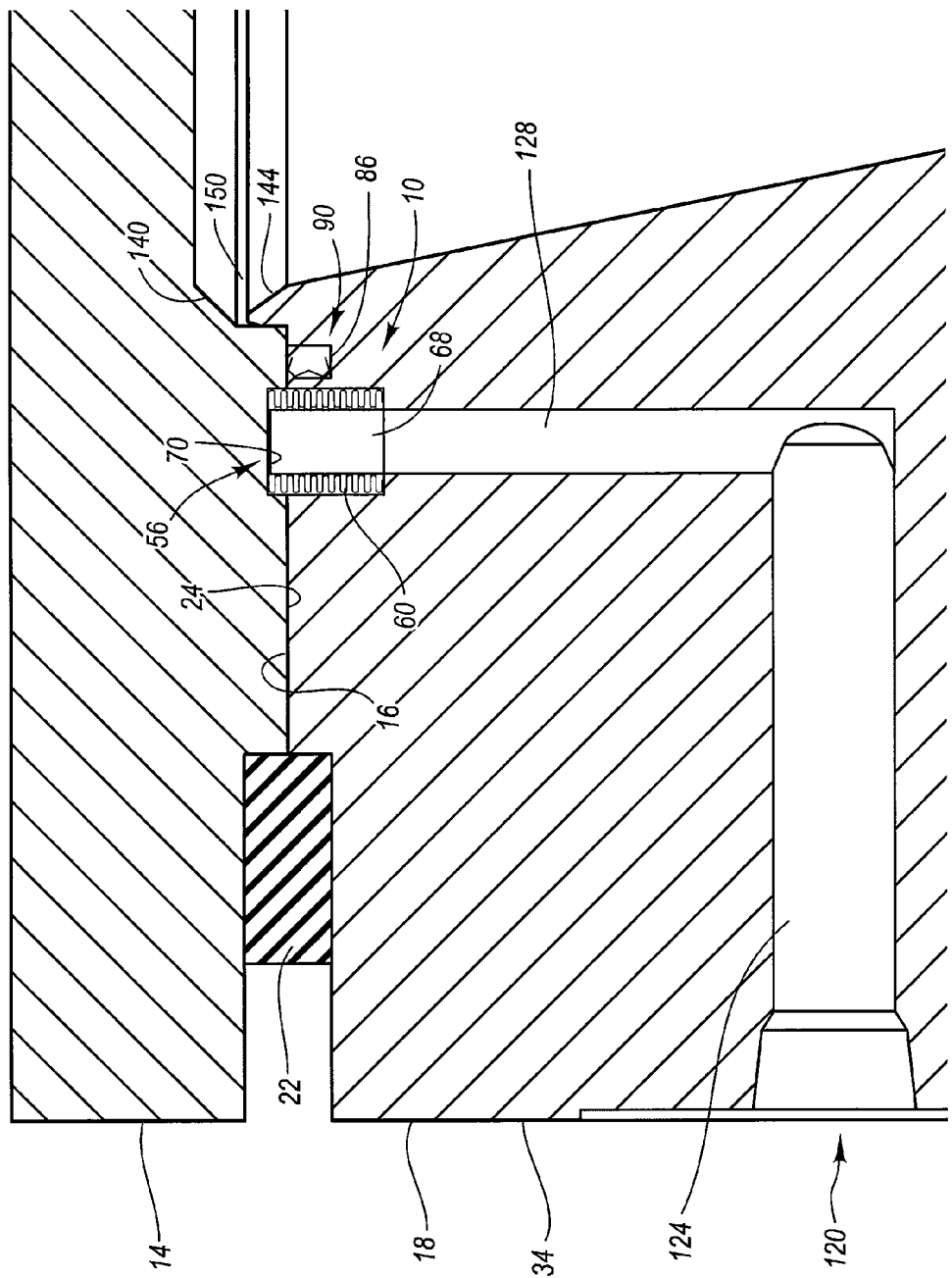
FIG. 4 illustrates a detailed cross-sectional view of the dynamic flange seal and sealing system as supported within and sealing the flange connections of first and second flanged components as coupled or secured together, according to one exemplary embodiment of the present invention.
Figure 5:
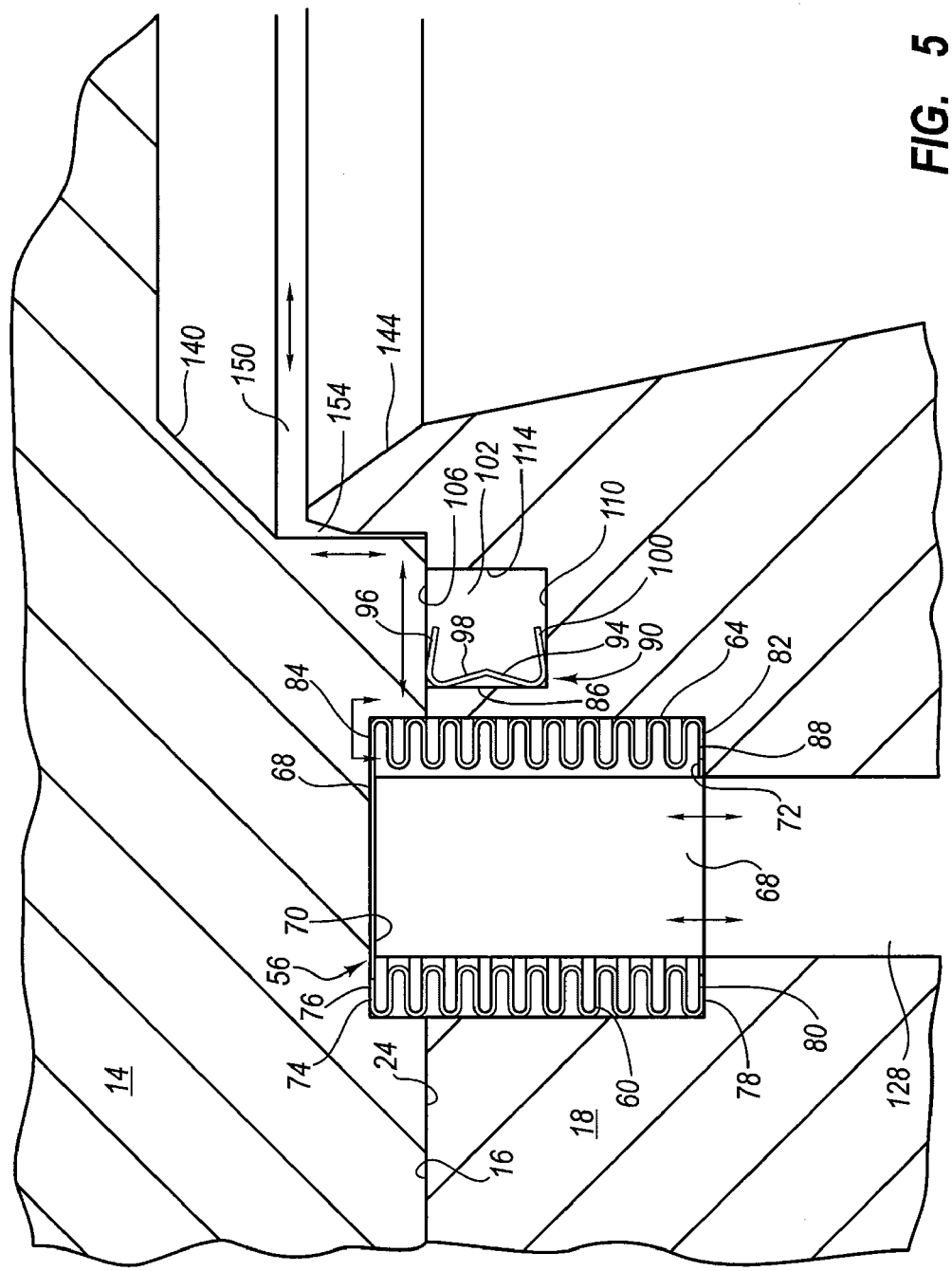
FIG. 5 illustrates a detailed cross-sectional view of the iconel bellows seal and the bi-material gasket elements of the dynamic flange seal and sealing system used to seal the flange connection of two components as coupled and secured together, according to one exemplary embodiment of the present invention.

FIGS. 4 and 5 illustrate detailed cross-sectional views of dynamic flange seal and sealing system 10, and particularly iconel bellows seal 56 and bi-material gasket 90, as supported within and sealing flanges 14 and 18 of first and second flanged components 12 and 20, respectively. With reference to iconel bellows seal 56, FIGS. 4 and 5 specifically illustrate iconel bellows seal as comprising an external form seal 60 and an internal form seal 64 separated by a seal spacer 68. Each of external and internal form seals 60 and 64 function to seal against sealing surfaces 16 and 24 of flanges 14 and 18, respectively, within recesses 70 and 72. External form seal 60 may be referred to as the primary seal, and internal form seal 64 may be referred to as the secondary seal. Moreover, bi-material gasket may be referred to as the tertiary seal. In other exemplary embodiments, iconel bellows seal 56 may comprise only a single form seal, or one o form seals comprising a different shape or configuration. Thus, the present illustrated configuration or assembly of iconel bellows seal 56 should not be considered limiting in any way, but merely exemplary of an exemplary, preferred, embodiment. Moreover, other structures capable of performing in a similar manner as an iconel bellows seal, namely structures that are dynamic and that can compensate and adjust for physical variations, but that may be different in form and function than an iconel bellows seal are contemplated for use herein. The particular focus of iconel bellows seal 56 is not in its particular configuration or form, but in its dynamic capabilities with respect to flanges 14 and 18. As such, other structures or systems capable of performing in a similar manner to create a dynamic flange are intended to be within the scope of the invention as taught and claimed herein.

In one exemplary embodiment, external and internal form seals 60 and 64 are biased, or spring-like members that comprise a corrugated configuration and that compliment one another to provide dynamic movement capabilities within iconel bellows seal 56. Each of internal form seals 60 and 64 are preferably made of high grade steel and are precision machined to comprise a spring constant, or what is substantially equivalent to a spring constant, capable of optimally performing in the intended environment. Likewise, seal spacer 68 is preferably made of high grade stainless steel. Of course, other material compositions for each of these components are contemplated herein, and may be utilized as appropriate. External and internal form seals 60 and 64 each comprise a plurality of corrugations, depending upon the particular size of iconel bellows seal 56 needed, that function to compress upon one another and against sealing surfaces 16 and 24 existing within recesses 70 and 72 of flanges 14 and 18, respectively. The relationship between each of these elements creates a flange seal, or rather a dynamic flange seal upon connection and securing of flange 14 to flange 18.

As shown, external form seal 60 and internal form seal 64 are supported or contained within recesses 70 and 72. Each of recesses 70 and 72 may be pre-manufactured or pre-machined into their respective flange, or they may be machined on-site as needed, such as to retro-fit an existing flange to comprise an iconel bellows seal. Recess 70 is formed into flange 14 and accepts or receives at least a portion of iconel bellows seal 56 therein and at least partially secures iconel bellows seal 56 in its intended position. In the embodiment shown in FIGS. 4 and 5, a majority of iconel bellows seal 56 is supported within recess 70, but this configuration should not be considered limiting in any way. Recess 72 is formed into flange 18 and also accepts or receives at least a portion of iconel bellows seal 56 therein, and also functions to at least partially secure iconel bellows seal 56 in its intended position. Stated differently, external and internal form seals 60 and 64 are contained and supported within recess 70 of flange 14 and extend up to and within recess 72 of flange 18. In this configuration, each of external and internal form seals 60 and 64 can compress and expand in a substantially linear manner (i.e. bi-directional transfer or displacement) to adjust to any physical disparity existing within flanges 14 and 18 as a result of various environmental changes within the system as a whole. Thus it can be said that iconel bellows seal 56 is a biased, dynamic seal that allows movement within and between the flange connection without affecting the performance of the flange seal.

Being able to compress and expand within its respective securing counterparts, namely flanges 14 and 18, allows iconel bellows seal 56 to maintain the integrity of the flange seal it creates. As discussed, external and internal form seals 60 and 64 are compressed to a portion of their total compression ratio upon connection of flanges 14 and 18. This allows iconel bellows seal 56 to comprise what is a biased, dynamic function. This function resultantly allows iconel bellows seal to adjust or adapt or modulate to varying temperatures, pressures, and/or compression forces existing or potentially existing between the flanges and the flange seal that create physical disparities within flanges 14 and 18, in order to preserve the integrity of the flange seal created by iconel bellows seal 56 and dynamic flange seal and sealing system 10. Indeed, often existing within flange connections of various components and their respective flange seals, especially within high temperature, high pressure systems, is a certain amount of structural differentials caused by the extreme pressure and temperature variations experienced. Such variations tend to induce a significant amount of physical stress in these connected components that leads to inflection or disparity within them, which disparity can subsequently induce a breach in the flange seal, thus creating leaks and inefficiency within the overall system. As such, flanges 14 and 18, while securely coupled to one another, may undergo significant stresses that cause their physical structures to become tweaked. For instance, the sealing surfaces of these two components may not be as tightly sealed together as possible as a result in the loss of the tight tolerances between the two as initially present. To account for any physical disparities or potential physical disparities, as a result of whatever manufacturing process is taking place, iconel bellows seal 56 comprises the biasing or dynamic element discussed above. Indeed, as flange 14 is connected to and secured to flange 18, iconel bellows seal 56, and particularly internal and external form seals 60 and 64, is/are at least partially compressed within recess 70 and recess 72, respectively, such that external form seal 60 and internal form seal 64 are allowed to compress and expand in a linear manner to account for and adjust to any physical disparity existing between flange 14 and flange 18. Thus, the dynamic relationship of iconel bellows seal 56 to flanges 14 and 18 functions to preserve the integrity of the flange seal created by iconel bellows seal 56.

In the embodiment shown in FIGS. 4 and 5, iconel bellows seal 56 is operational within a delayed coking system, wherein flange 14 is the flange of a coke drum and flange 18 is the flange of a header, de-header valve, or transitional spool. In this environment, approximately 450 p.s.i. is placed upon iconel bellows seal upon the connection and securing of flanges 14 and 18 together.

Iconel bellows seal 56 is preferably secured in a semi-sealed state. Of course, the present invention contemplates a complete seal, but this is not preferred for the reasons provided herein. With reference to FIGS. 4 and 5, external and internal form seals 60 and 64 are contained and supported within recesses 70 and 72 machined from flanges 14 and 18. The ends of internal form seals 60 and 64, namely toes 76, 80, 84, and 88, are the primary structural elements of form seals 60 and 64 that contact sealing surfaces 16 and 24 within recesses 70 and 72. In order to create a semi-sealed configuration, in one exemplary embodiment, only some of toes 76, 80, 84, and 88 are sealed to their respective flange counterparts. As mentioned above, fluid is allowed to travel or pass through flanges 14 and 18 and the flange seal created by dynamic flange seal and sealing system 10 sealing these two structures together, but only under controlled conditions. Indeed, it is preferable to be able to control the fluid and pressure within the overall system to counteract or offset any leaks and to prevent unwanted materials from entering into the flange seal. Indeed, if iconel bellows seal were completely closed off to fluid flow, steam purge system could not be used to monitor and control the flow of fluid between the flanges and within the flange seal. Thus, to allow operators this control, and to preserve the integrity of the flange seal and the life of the components or structures involved, iconel bellows seal 56 is only partially sealed to direct the flow in a certain direction and through specific, identified passageways. In the embodiment shown in FIGS. 4 and 5, iconel bellows seal 56 comprises toes 76, 80, and 88 that are sealed to their respective flange counterparts. Toe 84 is left unsealed to specifically direct and allow fluid flow through the space between toe 84 and sealing surface 24 of flange 14. As such, fluid flow is cut-off from flowing through iconel bellows seal 56 by leaving toe 84 unsealed, except through the passageway created between toe 84 and the portion of sealing surface directly opposite toe 84.

In one exemplary embodiment, sealing toes 76, 80, and 88 to their respective flange counterparts involves placing a specifically identified amount of silver within recesses 70 and 72 prior to inserting toes 76, 80, and 88 and at the precise location each of these toes contacts flanges 14 and 18 within recesses 70 and 72. The sealing of toes 76, 80, and 88 takes place upon securing flanges 14 and 18 together and by initiating a manufacturing process, such as a delayed coking process. The extreme heat and pressure existing within the system as a result of the coking process functions to meld or bond the silver to each of toes 76, 80, and 88, as well as to flanges 14 and 18, thus creating a seal, or a silver seal, therebetween. Other types of seals common in the art and capable of providing a seal at each toe are contemplated herein and may be utilized to provide the semi-sealed arrangement described herein. The particular type of seal will largely depend upon the environment in which the seal will be used.

The present invention dynamic flange seal and sealing system further comprises a bi-material gasket 90 positioned or arrayed in a circular manner around an opening or rim portion of flange 18 (the supporting flange) and that functions to create a flange seal. In the exemplary embodiment shown in FIGS. 4 and 5, bi-material gasket 90 is positioned inside iconel bellows seal 56 around sealing surface 24 of flange 18 in an adjacent or juxtaposed manner. However, the relative positioning of each of iconel bellows seal 56 and bi-material gasket 90 with respect to each other and the supporting flange may comprise several arrangements. Since these seals function independently of the other, as discussed above, each may be positioned at any location along and around the sealing surface of the supporting flange. Bi-material gasket 90 comprises flexor 94 and a flexible sealant 102 united or coupled with flexor 94. In one exemplary embodiment, flexor 94 comprises a corrugated metal/graphite gasket in the form of a metal c-ring having a flexible sealant 102, in the form of a high density graphite packing, bonded to inside surface 98 of flexor 94 and extending therefrom. Bi-material gasket 90 functions to provide a flange seal upon connection and securing of flange 14 to flange 18. Connecting flange 14 causes sealing surface 16 to contact flexor 94 and apply a downward, linear force to flexor 94. This force applied to flexor 94 causes it to flex or contract, thus displacing all or part of flexible sealant 102 away from flexor 94 and toward sealing surfaces 16 and 24 of flanges 14 and 18, respectively, wherein a flange seal is created. Flexible sealant 102 comprises several sealing faces, namely sealing faces 106, 110, and 114, that contact the parts of sealing surface 16 existing within recess 86, as well as sealing surface 24 to create a seal between the respective flange components. From FIGS. 4 and 5 it can be seen that flexor 94 is designed to extend above sealing surface 24 only a small amount. This amount may vary from design to design, but should be sufficient so that the complimentary flange being connected to the flange supporting flexor 94 contacts the top of flexor 94 enough to apply a force thereon and compress flexor 94 without interfering with the tight tolerance connection of flanges 14 and 18. Once compressed, flexible sealant 102 is forced to displace and seal against sealing surfaces 16 and 24. In the embodiment shown in FIGS. 4 and 5, bi-material gasket 90 is operational within a delayed coking process, wherein the flexor comprises a flex factor pre-designed or pre-identified for use within this particular type of system. The flex factor of flexor 94 is pertains to the compression force needed to flex or compress flexor 94 a sufficient amount to cause flexible sealant 102 to volumetrically displace. The flex factor also dictates the amount of proportional volumetric displacement of flexible sealant 102, the force of flexible sealant 10 against flanges 14 and 18, and the strength of the flange seal between these two components. As such, different flex factors can be built into different flexors, depending upon the limitations and constraints of the particular intended system the flexors will be used within. In the exemplary embodiment shown, flexor 94 comprises a flex factor that is set to cause flexor 94 to activate or operate properly upon compression reaching 2500 p.s.i. At this compression, flexor 94 is properly compressed or contracted and flexible sealant 102 is properly displaced and sealed against flanges 14 and 18 to create a flange seal. Thus, any increase in pressure will result in a stronger flange seal, and any decrease in pressure will result in possible breach of the flange seal where leaking may occur. Maintaining a proper amount or range of pressure upon flexor 94 can be accomplished using steam purge system 120, as discussed herein.

Another force acting upon flexor 94 to cause it to contract and displace flexible sealant 102 is the internal pressure within the system. Flexor 94 comprises a first toe 96 and a second toe 100. First and second toes 96 and 100 are preferably oriented in a downward manner, as shown, in order to respond favorably to the extreme pressure that often exists between connected flanges and within high pressure, high temperature manufacturing processes. As the pressure within the system rises, first and second toes 96 and 100 are further forced inward as a result of the pressure in the system, and particularly the steam purge line, thus contributing to the creation and maintenance of the flange seal initially created by the displaced flexible sealant 102.

Bi-material gasket 90 is supported within recess 86 of flange 18. In FIGS. 4 and 5, bi-material gasket 90 is installed inside and adjacent or juxtaposed to iconel bellows seal 56. As mentioned above, bi-material gasket 90 may serve as a tertiary seal along with the primary and secondary seals (external and internal form seals, respectively) of iconel bellows seal 56. However, as explained above, each of these components are independent of one another, but may be used to compliment one another to create a flange seal. Recess 86 is machined out of sealing surface 24 of flange 18, thus comprising a portion of sealing surface 24 within recess 86 to which flexible sealant 102 may seal against. Machining recess 86 to receive a bi-material gasket can be done with newly manufactured flanges, or the machining of recess 86 can be done to existing flanges on-site to modify them to be able to support and utilize bi-material gasket 90.

Figure 6:
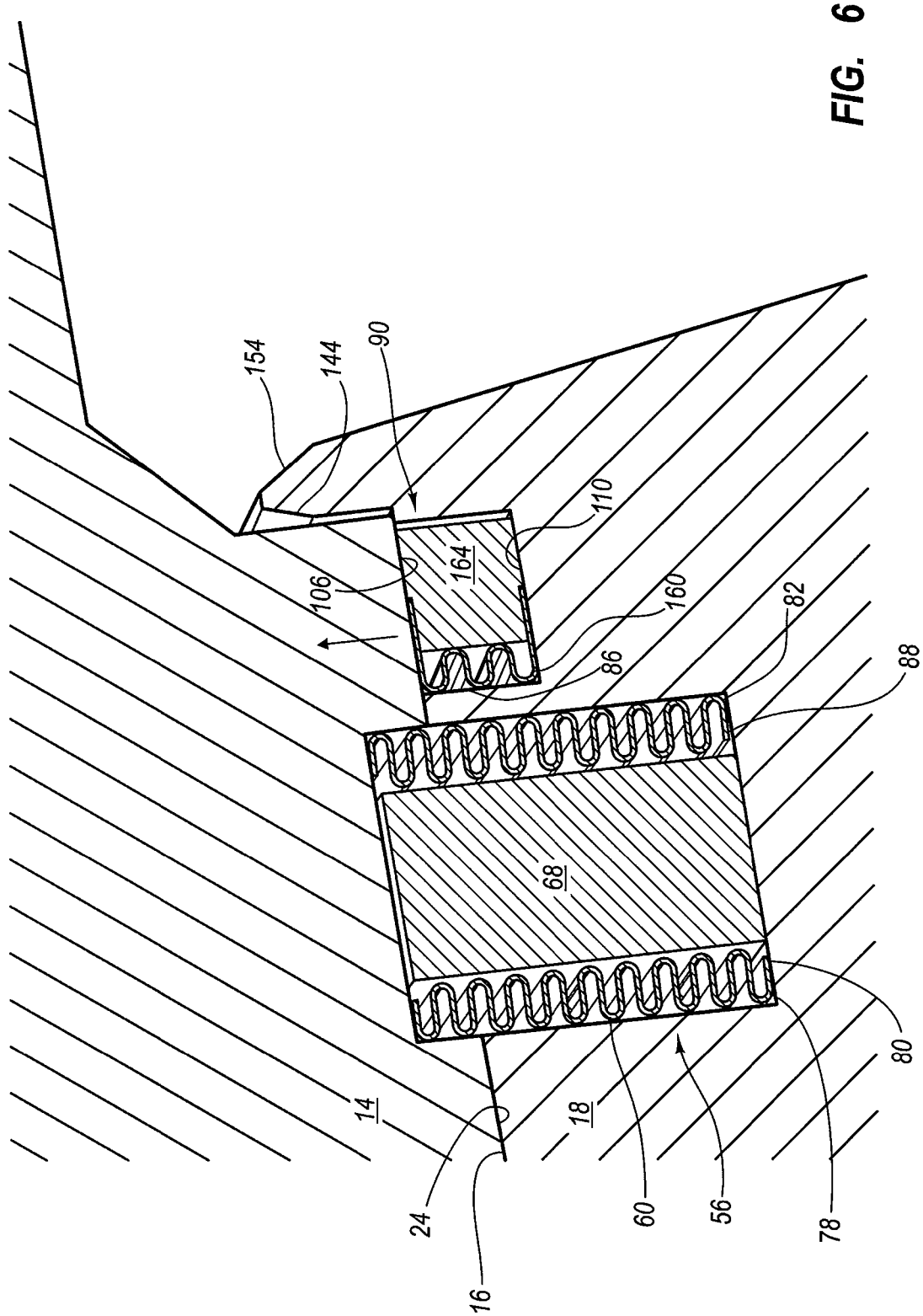
FIG. 6 illustrates an alternative embodiment of the dynamic flange seal and sealing system, and particularly the bi-material gasket.

FIG. 6 illustrates another exemplary embodiment of dynamic flange seal and sealing system 10. Specifically, FIG. 6 illustrates bi-material gasket 90 as comprising an alternative configuration and makeup. In this particular embodiment, bi-material gasket 90 comprises a flexor in the form of a corrugated iconel form seal in connection with a flexible braided graphite sealant. The flexible braided graphite sealant is comprised of a flexible jacket of expanded exfoliated grafoil. Unlike the previous embodiment in which flexible sealant 120 was bonded to inside surface 98 of flexor 94, the flexible sealant 164 illustrated in the embodiment shown in FIG. 6 does not bond or adhere to flexor 160. Rather, flexible sealant 164 is positioned adjacent flexor 160 and is at least partially extruded into the corrugated segments of flexor 160 upon compression of flexor 160 by flange 18. Despite its differences in structure, flexor 160 and associated flexible sealant 164 each function similarly to flexor 94 and flexible sealant 120 as illustrated in FIGS. 1-5 and discussed above, namely in that they function together to create a flange seal between flanges 14 and 18. Specifically, as flange 14 is connected and secured to flange 18 containing bi-material gasket 90 (and iconel bellows seal 56, as shown), flange 14 induces or applies a force to flexor 160, which causes it to compress. In the embodiment shown in FIG. 6, flexible sealant is caused to displace approximately 18%. Subsequently, the compression of flexor 160 causes flexible sealant to displace and seal against the sealing surfaces of flanges 14 and 18. As such, it can be said that bi-material gasket, in any form, is a flexible seal.

With reference to FIGS. 1-6, there the present invention further comprises a system for controlling the pressure and flow of fluid within the system and within the flange seal. Once connected, and once dynamic seal and sealing system 10 is functional, an identified and pre-determined fluid flow pattern exists within the connected components. This flow pattern is indicated or illustrated in FIG. 5 by the arrows. Fluid flows within flow channel 150, through duct 154, and generally along the lines indicated by the arrows, which indicate that fluid flows between sealing surfaces 16 and 24, as well as through the various flange seals created by dynamic flange seal and sealing system 10. As stated above, a steam purge inlet or system 120 is utilized to control the pressure within the system, as well as to provide controlled fluid flow. Duct 154 comprises a beveled edge for the purpose preventing pinching upon connection of flanges 14 ands 18, as well as for facilitating the removal of various materials or other debris as the flanged components are separated and re-connected. Providing a beveled edge in at least one of the vertical edges of duct 150 allows debris and material to be more easily released from the sides of duct 154.

Fluid flow is provided or allowed for several reasons. First, in the even one of the flange seals begins to deteriorate and fail, pressure can be increased to counteract and offset any fluid, material, or debris wanting to pass therethrough. Second, seal integrity can be maintained and controlled to a certain extent. Third, the sealing surfaces and flange connections can be kept clean and free of debris or other materials because the pressure can be increased through steam purge inlet 120, thus re-directing the flow of fluid and materials back toward their original location. Other advantages not specifically recited herein will be apparent to one ordinarily skilled in the art.

The present invention further features a method for sealing flanged components within a high temperature, high pressure environment. The method comprises the steps of: (a) obtaining a first component having a flange; (b) obtaining a second component having a flange, each of the flanges being complimentary to each other; (c) providing a dynamic flange sealing system within at least one of the flanges of the first and second components; and (d) securing the first component to the second component via their respective flanges, wherein the step of securing causes the flexor to contract or compress, and wherein the flexible sealant displaces and seals against the respective sealing surfaces of the flanges of the first and second components, relative to the amount the said flexor contracts or is compressed, the dynamic flange sealing system providing a flange seal between the first and second components.

The dynamic flange sealing system comprises an iconel bellows seal supported in one of the flanges of the first and second components and extends to and is received by the complimentary flange upon their connection, wherein the iconel bellows seal provides a dynamic seal between the first and second components; and a bi-material gasket supported within at least one of the flanges of either the first or second components, the bi-material gasket comprises a flexor and a flexible sealant partially connected to the flexor.

The present invention further features a method for modifying an existing flange connection to enhance the seal between a first and second flange. The method comprises the steps of: (a) obtaining a first component having a flange and at least one sealing surface thereon; (b) obtaining a second component having a flange and at least one sealing surface thereon, each of the flanges being complimentary to one another; (c) retro-fitting at least one of the flanges of the first and second components with a dynamic flange sealing system supported within its respective sealing surface; and (d) securing the first component to the second component via their respective flanges, thus causing the flexor to contract, wherein the flexible sealant displaces and seals against respective sealing surfaces on the flanges of the first and second components, relative to the amount the flexor contracts, the dynamic flange sealing system providing a flange seal between the first and second components.

The dynamic flange seal and sealing system comprises a bi-material gasket supported within one of the flanges of the first and second components, wherein the bi-material gasket comprises a flexor and a flexible sealant partially connected to the flexor. The dynamic flange sealing system may further comprise an iconel bellows seal supported in one of the flanges of the first and second components and extending to and received by the complimentary flange upon their connection, the iconel bellows seal providing a dynamic seal between the first and second components. The step of retrofitting comprises cutting a recess in said sealing surface to support said bi-material gasket.

The present invention dynamic flange seal and sealing system provides many advantages over prior art seals or sealing systems. First, less compression or force between the connected flanges is needed to maintain the integrity of the flange seal. This functions to preserve the life of the connection means used to connect and secure the two components together. For example, in systems using bolt connections to couple and secure two flanges together, such as within a high pressure, high temperature delayed coking environment, use of the present invention dynamic flange seal and sealing system requires the bolt connections to only be tightened or torqued to around sixty percent (60%) of their yield strength in order to maintain the integrity of the flange seal. This remaining or reserve yield strength within the bolts provides a significant amount of additional torque and subsequent compression between flanges, if needed. In similar systems using prior art sealing designs, the bolt connections are required to be tightened, or are torqued, to around ninety percent (90%) of their yield strength. Although this high stress level is required in order to maintain the seal between the connected flanges of the various components, it allows for very little additional torquing in each bolt that can be utilized if conditions require. Indeed, using prior art designs, if there is a leak in the flange seal between the connected flanges, the bolts can only be tightened a slight amount before they reach their full yield strength and shear, thus requiring them to be replaced. Moreover, continuous, or rather cyclical, tightening of bolt connections to this level of stress increases their rate of fatigue, thus decreasing their durability and overall life. Such is not the case with use of the present invention seal and sealing system.

Second, flange connections can maintain the same sealing material throughout several cycles of various manufacturing processes.

Third, existing flange connections can be modified or retrofit onsite to include the dynamic seal and sealing system of the present invention. This is advantageous for several reasons, including, components are not required to be replaced, there

What is claimed and desired to be secured by Letters Patent is:

1. A method for sealing flanged components within a high temperature, high pressure environment, said method comprising the steps of:
   obtaining a first component having a flange;
   obtaining a second component having a flange, each of said flanges being complimentary to each other;
   providing a dynamic flange sealing system within at least one of said flanges of said first and second components, said dynamic flange sealing system comprising:
      a corrugated bellow seal supported in one of said flanges of said first and second components and extending to and received by said complimentary flange upon their connection, said corrugated bellow seal being structured to be compressed between and structured to provide a dynamic seal between said first and second components;
   a bi-material gasket supported within one of said flanges of said first and second components, said bi-material gasket comprising a flexor, which comprises a corrugated metal generally c shaped ring and a flexible sealant partially connected to said flexor; and
   securing said first component to said second component via their respective said flanges, said step of securing causes said flexor to contract, wherein said flexible sealant displaces and seals against respective sealing surfaces on said flanges of said first and second components relative to the amount said flexor contracts, said dynamic flange sealing system providing a flange seal between said first and second components.

2. The method of claim 1, wherein said first and second components are selected from a group consisting of a coke drum, a transitional spool, a de-header valve, a header, an inlet feed, a bonnet, and any other similar component utilized and existing within a high temperature and pressure environment.

3. A method for sealing flanged components within a high temperature, high pressure environment, said method comprising the steps of:
   obtaining a first component having a flange;
   obtaining a second component having a flange, each of said flanges being complimentary to each other;
   providing a dynamic flange sealing system within at least one of said flanges of said first and second components, said dynamic flange sealing system comprising:
      a corrugated bellow seal supported in one of said flanges of said first and second components and extending to and received by said complimentary flange upon their connection, said corrugated bellow seal being compressed between and providing a dynamic seal between said first and second components;
   a bi-material gasket supported within one of said flanges of said first and second components, said bi-material gasket comprising a flexor, and a flexible sealant partially connected to said flexor; and
   securing said first component to said second component via their respective said flanges, said step of securing causes said flexor to contract, wherein said flexible sealant displaces and seals against respective sealing surfaces on said flanges of said first and second components relative to the amount said flexor contracts, said dynamic flange sealing system providing a flange seal between said first and second components.

4. A method for sealing flanged components within a high temperature, high pressure environment, said method comprising the steps of:
   obtaining a first component having a flange;
   obtaining a second component having a flange, each of said flanges being complimentary to each other;
   providing a dynamic flange sealing system within at least one of said flanges of said first and second components, said dynamic flange sealing system comprising:
      a bellow seal supported in one of said flanges of said first and second components and extending to and received by said complimentary flange upon their connection, said bellow seal being compressed between and providing a dynamic seal between said first and second components;
   a bi-material gasket supported within one of said flanges of said first and second components, said bi-material gasket comprising a flexor, which comprises a corrugated metal generally c shaped ring and a flexible sealant partially connected to said flexor; and
   securing said first component to said second component via their respective said flanges, said step of securing causes said flexor to contract, wherein said flexible sealant displaces and seals against respective sealing surfaces on said flanges of said first and second components relative to the amount said flexor contracts, said dynamic flange sealing system providing a flange seal between said first and second components.

* * * * *